US011768721B2

(12) United States Patent
Iida et al.

(10) Patent No.: US 11,768,721 B2
(45) Date of Patent: Sep. 26, 2023

(54) PROCESSING DEVICE

(71) Applicant: Hitachi Automotive Systems, Ltd., Hitachinaka (JP)

(72) Inventors: Takahiro Iida, Tokyo (JP); Takafumi Suzuki, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 570 days.

(21) Appl. No.: 17/040,686

(22) PCT Filed: Mar. 12, 2019

(86) PCT No.: PCT/JP2019/009874
§ 371 (c)(1),
(2) Date: Sep. 23, 2020

(87) PCT Pub. No.: WO2019/188233
PCT Pub. Date: Oct. 3, 2019

(65) Prior Publication Data
US 2021/0049057 A1 Feb. 18, 2021

(30) Foreign Application Priority Data
Mar. 30, 2018 (JP) ................. 2018-066759

(51) Int. Cl.
*G06F 9/54* (2006.01)
*G06F 11/14* (2006.01)
(Continued)

(52) U.S. Cl.
CPC .......... *G06F 9/544* (2013.01); *G06F 11/1471* (2013.01); *G06F 12/0842* (2013.01);
(Continued)

(58) Field of Classification Search
CPC .. G06F 9/544; G06F 11/1471; G06F 12/0842; G06F 2201/82
See application file for complete search history.

(56) References Cited

U.S. PATENT DOCUMENTS 6,983,330 B1 * 1/2006 Oliveira ................. H04L 69/32
709/239
9,274,861 B1 3/2016 Karppanen
(Continued)

FOREIGN PATENT DOCUMENTS

| JP | 2007-052668 A | 3/2007 |
| JP | 2013-171547 A | 9/2013 |
| JP | 2017-016285 A | 1/2017 |

OTHER PUBLICATIONS

Extended European Search Report issued in corresponding European Application No. 19775287.6 dated Dec. 7, 2021.
(Continued)

*Primary Examiner* — Zachary K Huson
(74) *Attorney, Agent, or Firm* — Foley & Lardner LLP

(57) ABSTRACT

The invention provides a technology for suppressing a delay in communication between a plurality of cores that perform parallel processing. In the invention, an ECU 302 of a vehicle control system 2 includes a plurality of cores 401 and a shared memory 405. When transmitting data in the inter-core communication, a transmission side core 401-1 writes a counter value updated according to the data and a writing order to a buffer unit 901 which is determined by a counter value managed for each communication system, which is stored in each of the plurality of buffer units 901 provided in the shared memory 405. When receiving data in the inter-core communication, a reception side core 401-2 reads data from the buffer unit 901 in which the latest data for each communication system is stored, which is determined by the counter value stored in each of the plurality of buffer units 901.

7 Claims, 8 Drawing Sheets

(51) Int. Cl.
  *G06F 12/0842* (2016.01)
  *G05D 1/02* (2020.01)

(52) U.S. Cl.
  CPC ..... *G05D 1/021* (2013.01); *G05D 2201/0213* (2013.01); *G06F 2201/82* (2013.01); *G06F 2212/1032* (2013.01)

(56) References Cited

U.S. PATENT DOCUMENTS

| | | | |
|---|---|---|---|
| 9,852,093 B2 | 12/2017 | Langer | |
| 2006/0221945 A1* | 10/2006 | Chin | H04L 49/103 370/381 |
| 2012/0179879 A1* | 7/2012 | Mamidala | G06F 12/0831 711/147 |
| 2015/0039865 A1 | 2/2015 | Ishigooka | |
| 2016/0080491 A1 | 3/2016 | Sykes et al. | |
| 2017/0264367 A1* | 9/2017 | Awwad | H04J 14/04 |
| 2017/0353554 A1 | 12/2017 | Feng et al. | |
| 2018/0373677 A1* | 12/2018 | Jaber | G06F 15/803 |

OTHER PUBLICATIONS

International Search Report with English translation and Written Opinion issued in corresponding application No. PCT/JP2019/009874 dated May 28, 2019.

* cited by examiner

FIG. 9

| COMMUNICATION IDENTIFIER | SENDER NAME | RECEIVER NAME | DATA TYPE | LABEL NAME |
|---|---|---|---|---|
| 1 | SWC1 | SWC2 | INT | XXXXX |
| 2 | SWC3 | SWC4 | FLOAT | YYYYY |
| 3 | : | : | : | : |

PROCESSING DEVICE

TECHNICAL FIELD

The present invention relates to a technology of an inter-core communication of a processing device that performs parallel processing by a plurality of cores.

BACKGROUND ART

As a processing device used for a vehicle control device that controls each part of a vehicle such as an automobile, a multi-core microcomputer that performs parallel processing by a plurality of cores is being utilized. In the multi-core microcomputer, it is required that a plurality of software executed in a plurality of cores share the same data, or that data be synchronized among the plurality of software. In order to realize data sharing and synchronization, it is necessary for the plurality of cores to communicate with each other. Communication between the plurality of cores is called an inter-core communication.

In the multi-core microcomputer, the plurality of cores operating in parallel enables consistent control equivalent to operating as a single core as a whole while sharing or synchronizing the data handled by each core.

As an example of the inter-core communication, a memory area that is shared by the plurality of cores (shared memory area) is provided, and the core that provides data stores the data in the shared memory area, and the core that uses the data acquires the data by referring to the shared memory area. When the plurality of cores write data to the shared memory area or read data from the shared memory area at their own timings, the same access to the same shared memory area may occur by the plurality of cores. There is a data conflict in simultaneous access. Due to the data conflict, there is a possibility that data in the shared memory area may be damaged, or data written at a timing different from an intended timing may be acquired and used for vehicle control. If a plural pieces of software operate in the same core, each piece of software can use an interrupt prohibition function to prevent data from being rewritten at unintended timings. However, the interrupt prohibition does not work across the plurality of cores.

There is an algorithm called spinlock as one of the exclusive processing that prohibits simultaneous access to avoid the data conflict between cores. The spinlock prepares a flag indicating that the access permission is obtained, and each core acquires the flag of the shared memory area before accessing a certain shared memory area (referred to as lock acquisition). The core that has acquired the lock executes a process of writing data to the target shared memory area or a process of reading data from the shared memory area. Then, after the processing is completed, the flag of the shared memory area is released (called lock release). The core that cannot acquire the lock waits in a loop until the lock is acquired. By using this spinlock algorithm, it is possible to avoid the data conflict in which one core accesses the shared memory while another core accesses the shared memory area. However, when the spinlock algorithm is used, the core waits in a loop process until a lock can be acquired when the lock cannot be acquired, and therefore the shared memory area cannot be accessed during that time. Therefore, there is a problem that vehicle control in the core is delayed.

PTL 1 discloses a technique in which a First In First Out (FIFO) is provided in the shared memory, an identifier for identifying each of a plurality of client processes is written in the FIFO together with data, and data is distributed on the read side of the FIFO according to the read identifier.

CITATION LIST

Patent Literature

PTL 1: JP 2007-052668 A

SUMMARY OF INVENTION

Technical Problem

However, in the technique of PTL 1, it is not possible for a plurality of cores to access simultaneously on the write side and the read side of the FIFO. Therefore, when a large number of access requests to the FIFO are concentrated, a processing delay may occur.

An object of the invention is to provide a technology for suppressing a delay in communication between a plurality of cores that perform parallel processing.

Solution to Problem

A processing device according to an aspect of the invention performs parallel processing by a plurality of cores, and performs an inter-core communication of a plurality of communication systems that are distinguished as separate communications by the plurality of cores. The processing device includes a shared memory that is accessible by the plurality of cores at the same time and is provided with a plurality of buffer units that can be used for the inter-core communication, a transmission core that writes data to the buffer unit in the inter-core communication via the shared memory, and a reception core that reads data from the buffer unit in the inter-core communication. When transmitting data by the inter-core communication, the transmission core stores the data and a counter value updated according to a writing order to the buffer unit determined by a counter value managed for each of the communication systems respectively stored in the plurality of buffer units. When receiving data in the inter-core communication, the reception core reads data from a buffer unit in which latest data of each of the communication systems, which is determined by the counter value stored in each of the plurality of buffer units.

The invention solves the above problem by providing the buffer units in the shared memory and switching between the buffer units for writing data and the buffer for reading data by counting up.

The transmission core that writes data overwrites the data in the buffer unit that stores old data based on the counter value stored in the buffer unit. The reception core that reads data reads the data from the buffer unit storing latest data based on the counter value. In this way, by using the counter value, communication waiting such as FIFO read wait and spinlock does not occur.

Further, by using the communication identifier, it becomes possible to share the buffer unit in a plurality of communication systems.

Advantageous Effects of Invention

According to the invention, control delay due to communication standby is eliminated. Further, by sharing the buffer

BRIEF DESCRIPTION OF DRAWINGS

FIG. 9 is a diagram illustrating an example of communication identification information.

DESCRIPTION OF EMBODIMENTS

Next, embodiments of the invention will be described. Here, a vehicle system which is a preferred example to which the invention is applied is described. However, the invention is not limited to these embodiments and does not prevent application to other than vehicle systems.

First Embodiment

A first embodiment will be described below with reference to FIGS. 1 to 5.

<Configuration of Vehicle System>

Figure 1:
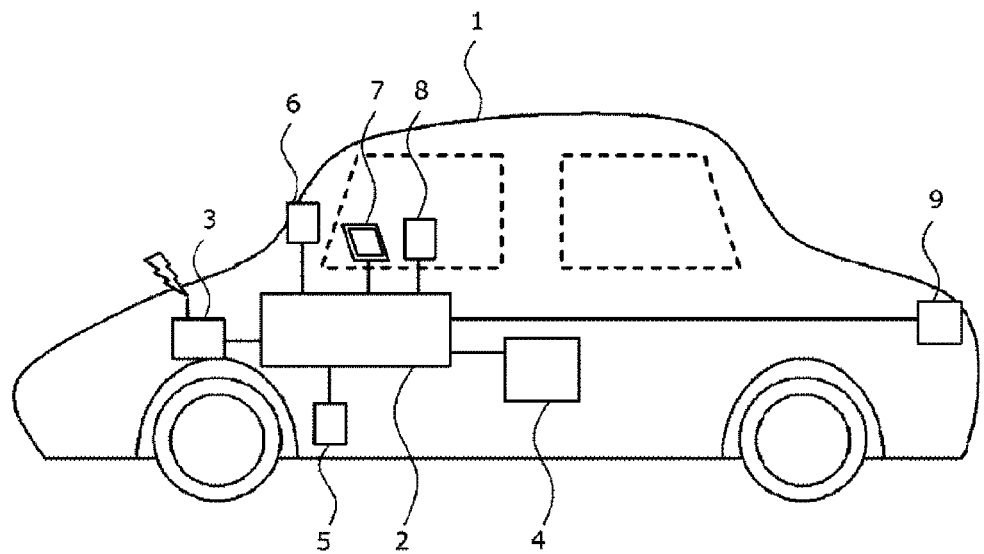
FIG. 1 is a diagram illustrating a configuration of a vehicle system in a first embodiment.

FIG. 1 illustrates an example of a vehicle system configuration having a vehicle control system of this embodiment.

As illustrated in FIG. 1, a vehicle system 1 mounted in an automobile includes a vehicle control system 2, a communication device 3, the other vehicle control system 4, a drive device 5, a recognition device 6, an output device 7, an input device 8, and a notification device 9.

The vehicle control system 2 has an in-vehicle network and a plurality of electronic control units (ECU, etc.). The vehicle control system 2 is connected to the communication device 3, the other vehicle control system 4, the drive device 5, the recognition device 6, the output device 7, the input device 8, and the notification device 9, and transmits/receives control signals and various information therebetween. The configuration of the vehicle control system 2 will be described later.

The communication device 3 is used for communication between the vehicle control system 2 and the outside of the vehicle system 1. The communication device 3 performs wireless communication with the outside of the vehicle system 1 to acquire information on the infrastructure and other vehicles, and to send information about the own vehicle to the outside. As the wireless communication, for example, mobile communication, public wireless LAN communication, inter-vehicle communication, and the like are used. Further, the communication device 3 includes a diagnostic terminal (OBD: On-board diagnostics), an Ethernet terminal, a terminal for connecting an external recording medium (for example, a USB memory, an SD card, etc.), and the external device is connected to these terminals to perform wired communication. "Ethernet" is a registered trademark.

The other vehicle control system 4 is configured by, for example, an in-vehicle network and an electronic control unit that use the same or different communication protocol as the vehicle control system 2.

The drive device 5 is an actuator or the like that drives mechanical and electric devices (for example, an engine, a transmission, wheels, a brake, a steering device, etc.) that control the vehicle motion under the control of the vehicle control system 2.

The recognition device 6 acquires information input from the outside world and generates outside world recognition information. The recognition device 6 is, for example, a camera, radar, LIDAR (Light Detection and Ranging, or Laser Imaging Detection and Ranging), an external sensor such as an ultrasonic sensor, and a mechanical sensor (acceleration, axle speed, GPS: Global Positioning System) or the like that recognizes the state of the vehicle system 1 (motion state, position information, etc.).

The output device 7 receives data transmitted from the vehicle control system 2, and displays or outputs necessary information such as message information (for example, video, sound). The output device 7 is, for example, a liquid crystal display, a warning light, a speaker, or the like.

The input device 8 generates an input signal according to a user operation. The input device 8 transmits the input signal to the vehicle control system 2. The input device 8 is, for example, a steering wheel, a pedal, a button, a lever, a touch panel, or the like.

The notification device 9 notifies the outside of the state of the vehicle and the like. The notification device 9 is, for example, a lamp, an LED, a speaker, or the like.

<Configuration of Vehicle Control System>

Figure 2:
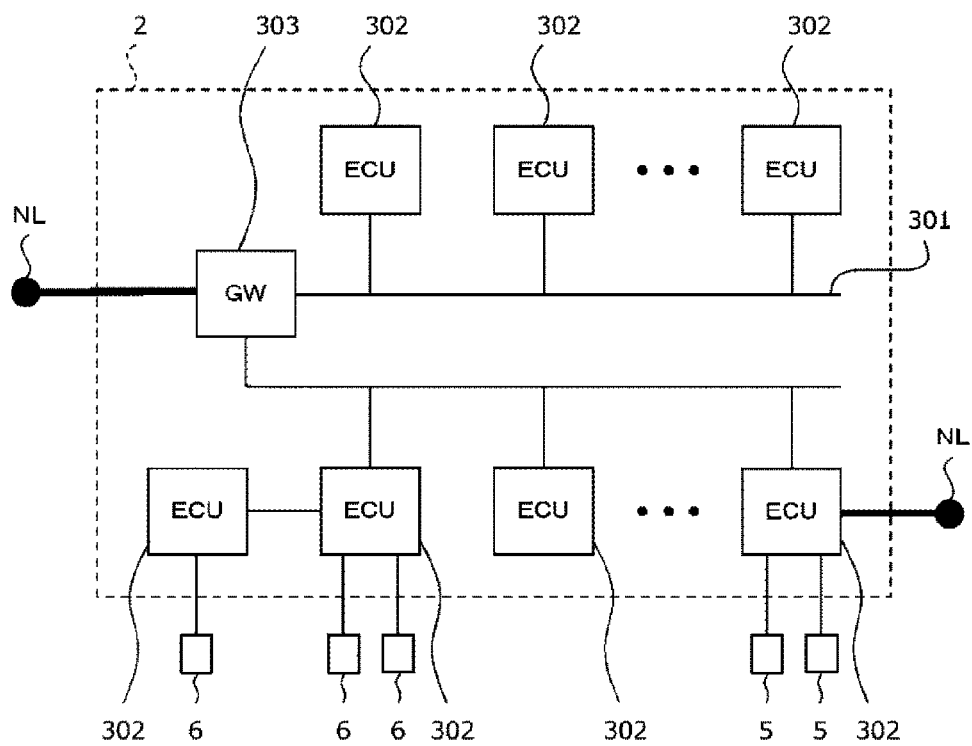
FIG. 2 is a diagram illustrating a configuration of a vehicle control system in the first embodiment.

FIG. 2 illustrates a hardware configuration example of the vehicle control system 2.

As illustrated in FIG. 2, the vehicle control system includes a network link 301, a plurality of electronic control units 302, and a gateway 303.

The network link 301 is an in-vehicle network, and connects the plurality of electronic control units 302 and the gateway 303. The network link 301 is configured by, for example, Controller Area Network (CAN), CAN with Flexible Data-rate (CAN FD), Ethernet or the like.

The electronic control unit 302 (hereinafter, simply referred to as "ECU 302") is connected to the network link 301. Some of the plurality of ECUs 302 are connected to the drive device 5, the recognition device 6, and the like, output a control signal to the drive device 5 based on the data received from the network link 301, and output the recognition information acquired from the recognition device 6 to the network link 301. Further, some other ECUs 302 have a gateway function and are connected to other network links NL (including dedicated lines). The configuration of the ECU 302 will be described later.

The gateway 303 (hereinafter, simply referred to as "GW 303") connects the network link 301 and another network link NL to each other, converts the protocol from one network link to the other network link as necessary, and relays the data. The GW 303 may function as an electronic control unit.

FIG. 2 illustrates a bus type configuration in which a plurality of ECUs 302 are connected to two network links, as an example of a connection form (network topology). Other than this, a star type in which the plurality of ECUs 302 are directly connected to the GW 303, a ring type in which the plurality of ECUs 302 are connected in a ring shape, a mixed type in which each type is mixed and configured by a plurality of networks may be used.

<Configuration of Electronic Control Unit (ECU)>

Figure 3:
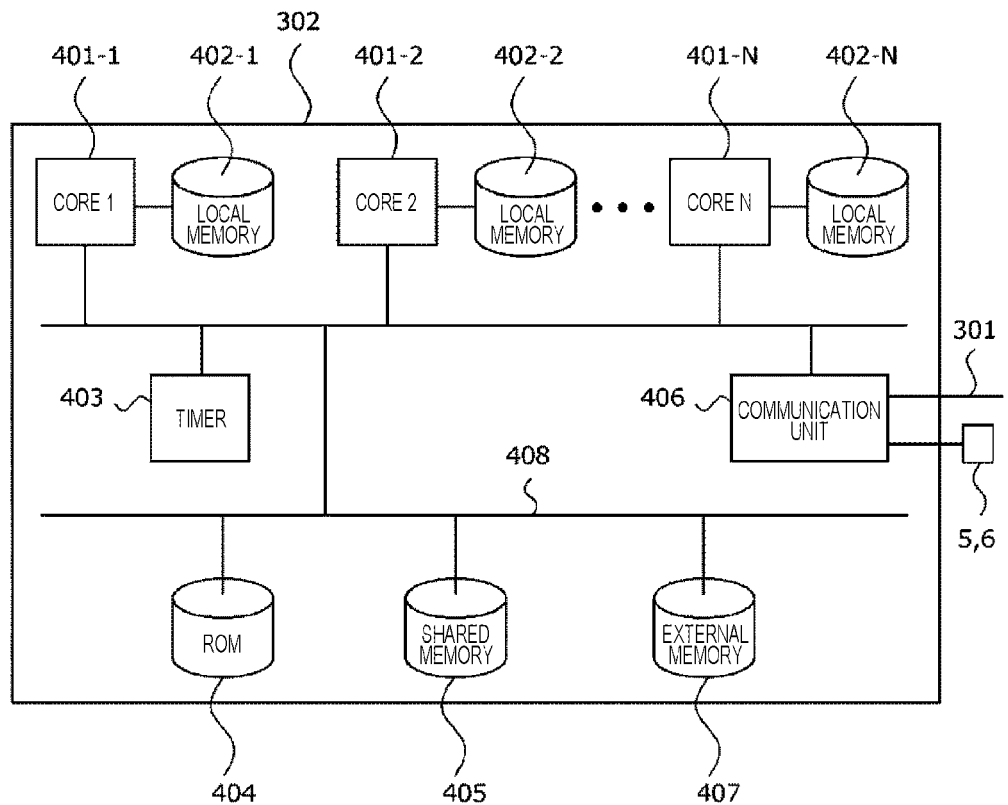
FIG. 3 is a diagram illustrating a H/W configuration of an ECU in the first embodiment.

FIG. 3 illustrates a configuration example of the ECU 302. The GW 303 also has a similar configuration.

The ECU 302 includes a plurality of cores 401 as a processing device, a plurality of local memories 402, a timer 403, a ROM 404, a shared memory 405, a communication unit 406, an external memory 407, and an internal bus 408.

The core 401 is configured by a processor such as a CPU (Central Processing Unit) having a computing element and a memory element such as a register or a cache.

In this embodiment, N cores 401 (401-1 to 401-N, N is a natural number of 2 or more) are provided. The plurality of cores 401 execute parallel processing, and the plurality of cores 401 perform inter-core communication of a plurality of communication systems that are distinguished as separate communications.

The local memory 402 is configured by a Random Access Memory (RAM) and stores volatile data. In this embodiment, N local memories 402 (402-1 to 402-N) are provided corresponding to the respective cores 401 (401-1 to 401-N). Each local memory 402 can be accessed only by the corresponding core 401.

The timer 403 has a timekeeping function and is used in various time-related controls.

The ROM 404 stores software and non-volatile data.

The shared memory 405 is configured by a Random Access Memory (RAM) and stores volatile data. The shared memory 405 is connected to the internal bus 408 and can be simultaneously accessed by the plurality of cores 401. The shared memory 405 is provided with a plurality of buffer units 901 that can be used for inter-core communication. The configuration of the shared memory 405 will be described later.

The communication unit 406 is an input/output interface with the outside of the ECU 302. The communication unit 406 is connected to the network link 301. Further, the communication unit 406 is connected to the drive device 5, the recognition device 6, and the like, and transmits/receives control signals, recognition information, and the like therebetween.

The external memory 407 is configured by a non-volatile memory device that can hold data even after the power is cut off. The external memory 407 is, for example, an Electrically Erasable Programmable Read-Only Memory (EEPROM), a Solid State Drive (SSD), a Hard Disc Drive (HDD), or the like.

The internal bus 408 is connected to the plurality of cores 401, the timer 403, the ROM 404, the shared memory 405, the communication unit 406, and the external memory 407, and communication inside the ECU 302 is performed using the internal bus 408. The plurality of cores 401 access the shared memory 405 via the internal bus 408.

In this embodiment, the plurality of cores 401, the plurality of local memories 402, the timer 403, the ROM 404, the shared memory 405, the communication unit 406, and the internal bus 408 of the ECU 302 are configured by one multi-core microcomputer for vehicle control. By configuring the ECU 302, the multi-core microcomputer controls the vehicle based on the state of the vehicle and a control instruction.

In a multi-core microcomputer for vehicle control, which is required to perform a plurality of controls in parallel with a small delay, inter-core communication by a plurality of communication systems can be performed in parallel to suppress the delay. By adopting a multi-core microcomputer, the ECU 302 can be made compact. Alternatively, the ECU 302 may be configured by combining separate integrated circuits such as a CPU, various memories, a timer module, and a communication module.

<Configuration of Functional Module>

Figure 4:
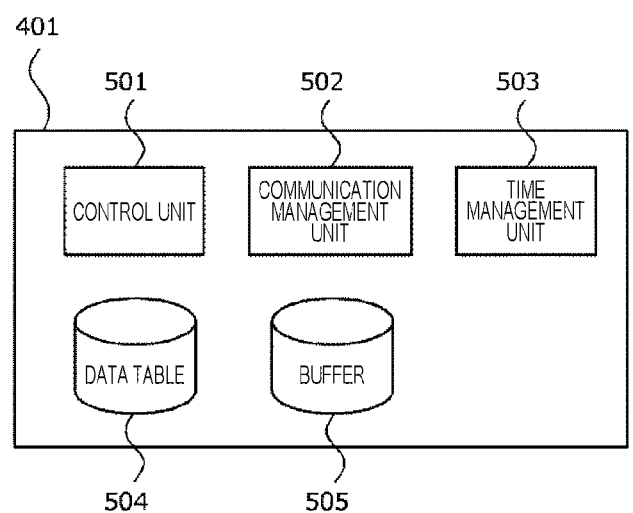
FIG. 4 is a diagram illustrating a functional module configuration of the ECU in the first embodiment.

FIG. 4 illustrates a configuration example of a functional module realized by the operation of the core 401.

As illustrated in FIG. 4, the core 401 functions as a control unit 501, a communication management unit 502, a time management unit 503, a data table 504, and a buffer 505.

The control unit 501 analyzes the data acquired from the communication unit 406 and controls the entire functional module.

The communication management unit 502 manages the operation and state of the communication unit 406, and gives an instruction to the communication unit 406 via the internal bus 408.

The time management unit 503 manages the timer 403, and acquires and controls time-related information.

The data table 504 holds information necessary for vehicle control.

The buffer 505 temporarily stores data.

The functional module illustrated in FIG. 4 illustrates an operation concept on the core 401. The core 401 appropriately reads information necessary for operation from the ROM 404 and the shared memory 405, or appropriately writes information to the ROM 404 and the shared memory 405. The core 401 also uses the local memory 402 as a temporary data storage location.

<Configuration of Shared Memory and Software Component>

Figure 5:
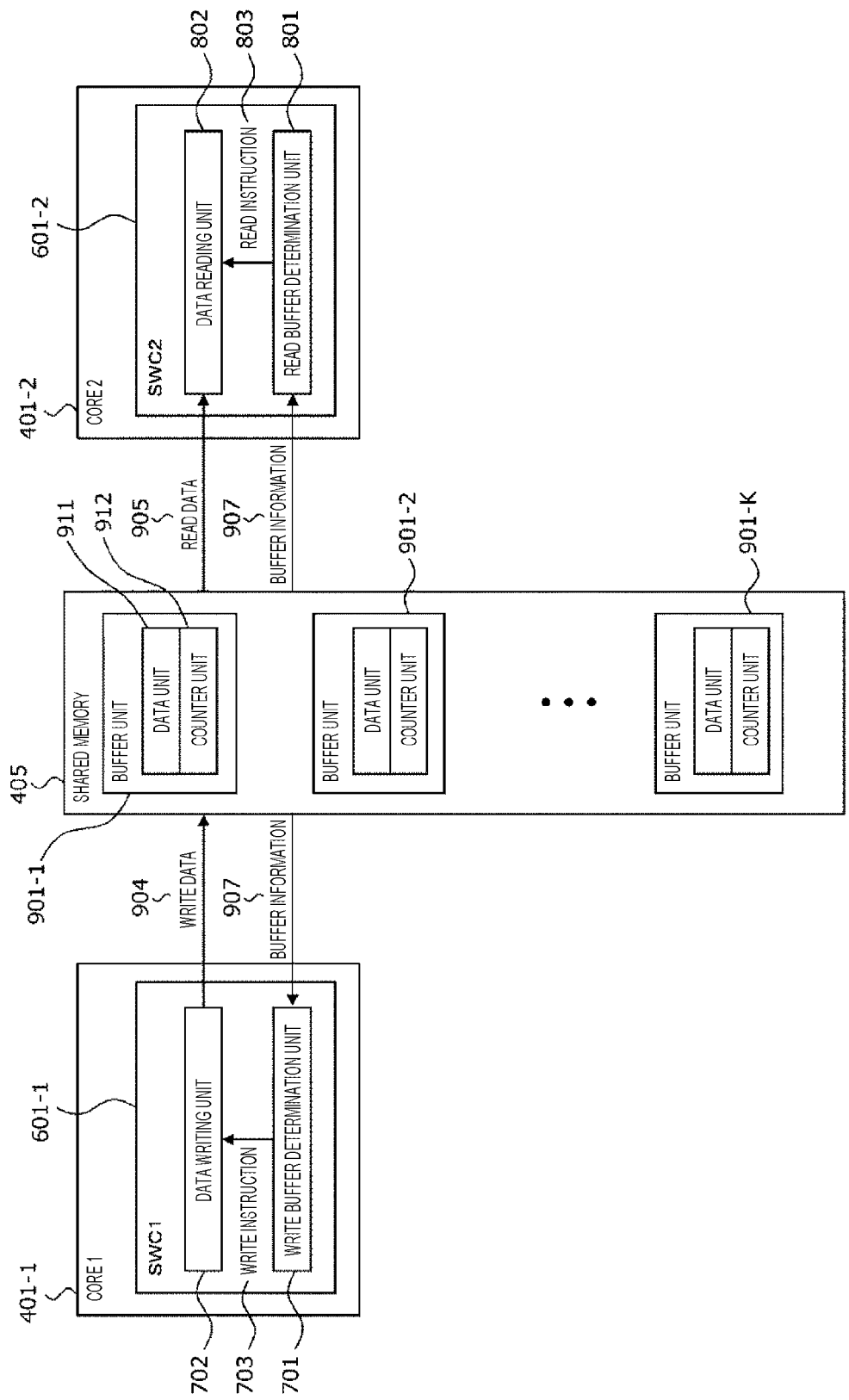
FIG. 5 is a diagram illustrating a relationship between each core and a buffer unit for inter-core communication in the first embodiment.

FIG. 5 illustrates a configuration example of a software component realized by the shared memory 405 and each core 401 executing multi-core software.

In FIG. 5, two cores 401 perform data communication (inter-core communication) via the shared memory 405. That is, a transmission side core 401-1 (transmission core) writes data to the buffer unit 901 described later during inter-core communication via the shared memory 405, and a reception side core 401-2 (reception core) reads data from the buffer unit 901 during inter-core communication. Such inter-core communication has a plurality of communication systems that are distinguished as separate communications. The communication system can be provided, for example, for each type of data transmitted and received in inter-core communication. In the example of vehicle control of an automobile, the type of data includes an accelerator depression amount, a brake depression amount, a steering wheel operation amount, and the like, and can be said to be a control item for vehicle control. A communication system is provided for each data type, that is, for each control item.

First, the configuration of the shared memory 405 will be described.

The shared memory 405 is provided with a plurality of buffer units 901 (901-1, 901-2, . . . , 901-K; K is a natural number of 2 or more) used for transmitting and receiving data in inter-core communication.

Each buffer unit 901 of the shared memory 405 includes a data unit 911 and a counter unit 912.

The data unit 911 is an area for storing data (hereinafter, simply referred to as "transmission/reception data") transmitted/received for sharing or synchronizing between cores. The data unit 911 stores various data types (Int type, Long type, Float type, Char type, Boolean type, . . . ) or arrays, structures, and pointer type transmission/reception data.

The counter unit 912 is an area for storing a counter value indicating the order relationship indicating old/new of the transmission/reception data stored in the data unit 911. In the counter unit 912, for example, numbers indicating the order (1, 2, 3, 4, . . . ) are stored in various data types (Int type, Long type, Float type, Char type, Boolean type, . . . ). The counter value may represent the order relationship, or may express the order relationship by a character string (for example, first, second, third, . . . ) or the like.

The plurality of buffer units 901 may be arranged side by side in continuous addresses. Alternatively, the buffer units may be arranged at discontinuous addresses and connected in a list structure using pointer-type data indicating the connection relationship before and after each buffer. The same applies to the second to fifth embodiments described below.

In this embodiment, the plurality of buffer units 901 are provided for each of the plurality of communication systems. For example, a plurality of buffer units 901 is provided for each transmission/reception data type, such as a communication system for transmitting/receiving data regarding the accelerator depression amount, a communication system for transmitting/receiving data regarding the brake depression amount, and a communication system for transmitting/receiving data regarding the steering wheel operation amount. Similarly, in the second and third embodiments described below, the plurality of buffer units 901 are provided for each of a plurality of communication systems (that is, for each type of transmission/reception data).

Next, the software components will be described.

The control unit 501 of the plurality of cores 401 functions as a software component 601 (hereinafter, simply referred to as "SWC 601") by executing the multi-core software stored in the ROM 404. The SWC 601 is provided in N (601-1 to 601-N) corresponding to the respective cores 401 (401-1 to 401-N). The SWC 601 starts processing, for example, periodically (every 1 ms, every 2 ms, every 10 ms, . . . ) or in response to an event (switch ON/OFF, IGN ON/OFF, . . . ).

The SWC 601-1 of the core 401-1, which is the transmission side of the transmission/reception data in the inter-core communication, writes the transmission/reception data and the counter value updated according to the writing order to the buffer unit 901 determined by the counter value which is managed for each communication system stored in each of the plurality of buffer units 901 when transmitting/receiving the transmission/reception data in the inter-core communication. The SWC 601-1 includes a write buffer determination unit 701 and a data writing unit 702.

The write buffer determination unit 701 determines one buffer unit 901 to which the transmission/reception data is written from among the plurality of buffer units 901. In this embodiment, the write buffer determination unit 701 collects the counter value stored in each counter unit 912 of the plurality of buffer units 901 used in the communication system related to the transmission/reception data as buffer information 907. Then, the buffer unit 901 having the counter unit 912 storing the oldest counter value is selected from the plurality of buffer units 901. Thereafter, the write buffer determination unit 701 notifies the data writing unit 702 of the selected buffer unit 901 as a write instruction 703.

The data writing unit 702 writes write data 904 as the transmission/reception data to the data unit 911 of the buffer unit 901 indicated by the write instruction 703, and also writes the latest counter value to the counter unit 912 of the buffer unit 901.

The SWC 601-2 of the core 401-2, which is the reception side of the transmission/reception data of the inter-core communication, reads the transmission/reception data from the buffer unit 901 storing the latest transmission/reception data for each communication system, which is determined by the counter value managed for each communication system stored in each of the plurality of buffer units 901 when the transmission/reception data is received in the inter-core communication. The SWC 601-2 includes a read buffer determination unit 801 and a data reading unit 802.

The read buffer determination unit 801 determines one buffer unit 901 to which the transmission/reception data is read from among the plurality of buffer units 901. In this embodiment, the read buffer determination unit 801 collects the counter value stored in each counter unit 912 of the plurality of buffer units 901 used in the communication system related to the transmission/reception data as the buffer information 907. Then, the buffer unit 901 having the counter unit 912 storing the latest counter value is selected from the plurality of buffer units 901. Thereafter, the read buffer determination unit 801 notifies the data reading unit 802 of the selected buffer unit 901 as a read instruction 803.

The data reading unit 802 reads read data 905 as the transmission/reception data from the data unit 911 of the buffer unit 901 indicated by the read instruction 803.

In this way, the different cores 401-1 (SWC 601-1) and 401-2 (SWC 601-2) operating in parallel can share the same data by passing via the plurality of buffer units 901 of the shared memory 405.

According to this embodiment, for the data to be shared among the plurality of cores 401, the transmission side core 401-1 accesses the buffer unit 901 in which the oldest transmission/reception data stored in the shared memory 405 is stored, and the reception side core 401-2 accesses the buffer unit 901 in which the latest transmission/reception data is stored. Therefore, even if writing by the transmission side core 401-1 and reading by the reception side core 401-2 are performed at the same time, the inter-core communication is possible without causing data conflicts while not locking the processing since these cores access different areas.

Therefore, by using the counter value, there is no need to wait for FIFO reading or communication standby such as spinlock as in the related art, so that control delay can be suppressed.

Second Embodiment

Next, a second embodiment will be described.

The difference of the second embodiment from the first embodiment is that the data conflicts can be avoided by using the status value indicating the usage status value of the buffer unit 901, even if the data writing unit 702 of the transmission side core 401 and the data reading unit 802 of the reception side core 401 access the same buffer unit simultaneously by any chance.

In the second embodiment, the vehicle system, the vehicle control system, the electronic control unit, and the functional module are the same as those in the above-mentioned first embodiment, and the description thereof will be omitted.

The shared memory and software components in the second embodiment will be described below with reference to FIG. 6.

<Configuration of Shared Memory and Software Component>

Figure 6:
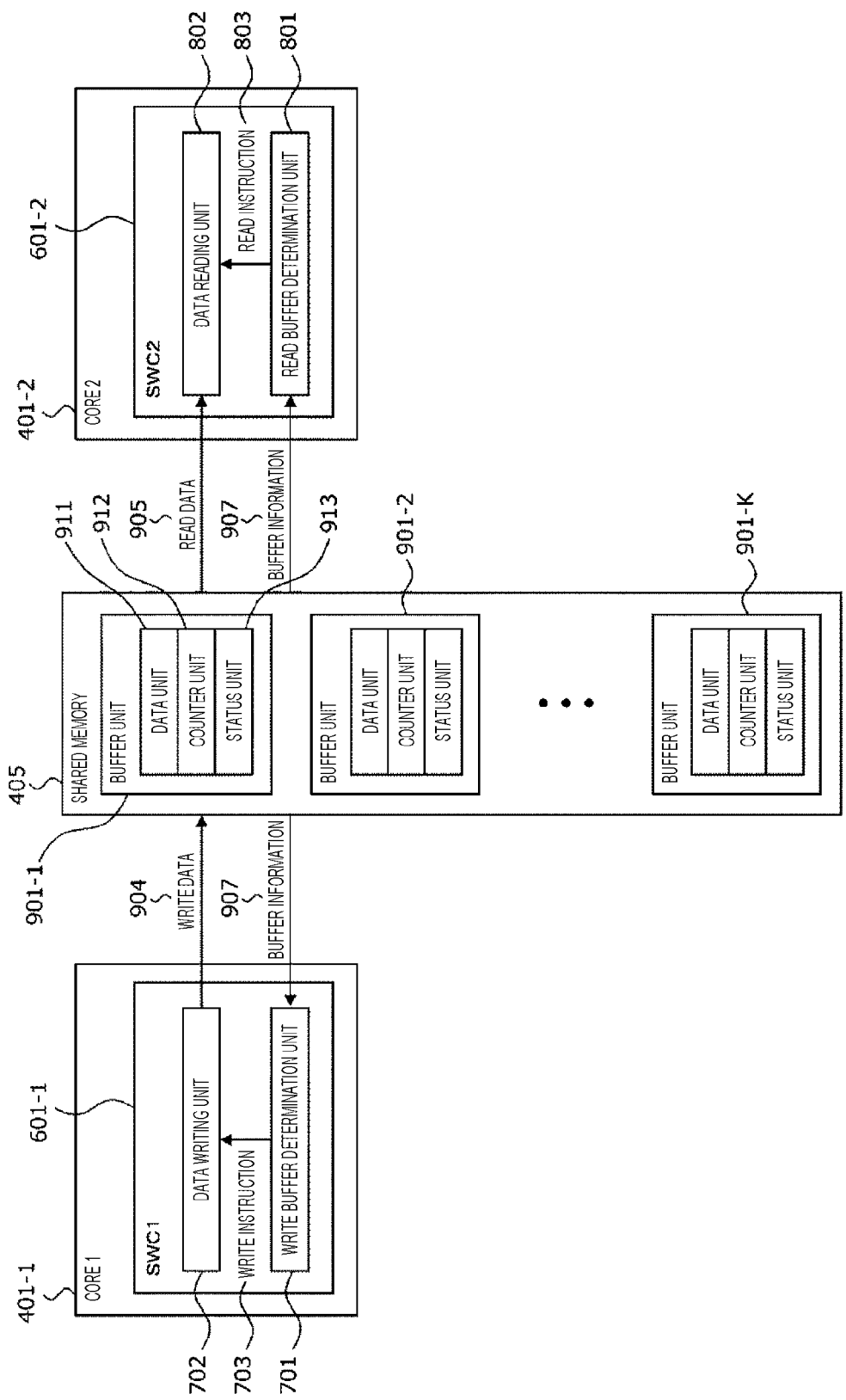
FIG. 6 is a diagram illustrating a relationship between each core and a buffer unit for inter-core communication in a second embodiment.

FIG. 6 illustrates a configuration example of software components realized by the shared memory 405 and each core 401 executing multi-core software.

In FIG. 6, two cores 401 perform data communication (inter-core communication) via the shared memory 405. That is, the transmission side core 401-1 writes data to the buffer unit 901 during inter-core communication via the shared memory 405, and the reception side core 401-2 reads data from the buffer unit 901 during inter-core communication.

Specifically, the buffer unit 901 of the shared memory 405 stores a status value indicating that it is using or unused. The transmission side core 401 selects the buffer unit 901 that stores the oldest counter value from the buffer unit 901 that stores unused status value, and stores the using status value before writing data to the buffer unit 901. The unused status value is stored after the data is written in the buffer unit 901. The reception side core 401 selects the buffer unit 901 that stores the latest counter value from the buffer unit 901 that stores the unused status value, and stores the using status value before reading data from the buffer unit 901. The using status is stored after the data is read from the buffer unit 901.

First, the configuration of the shared memory 405 will be described.

The shared memory 405 is provided with the plurality of buffer units 901 (901-1, 901-2, . . . , 901-K; K is a natural number of 2 or more) used for transmitting and receiving data in inter-core communication.

Each buffer unit 901 of the shared memory 405 includes the data unit 911, the counter unit 912, and a status unit 913.

The data unit 911 and the counter unit 912 have the same configurations as in the first embodiment.

The status unit 913 stores a status value indicating the usage status of the buffer unit 901. The value stored as the status value includes at least a value indicating that the buffer unit 901 is unused and a value indicating that the buffer unit 901 is in use. The status value is implemented by a data type (Int type, Long type, Float type, Char type, Boolean type, . . . ) that can represent at least two values so that the value can represent unused and in use. In this embodiment, values other than the status value indicating unused indicate in use.

Next, the software components will be described.

The SWC 601-1 of the transmission side core 401-1 includes a write buffer determination unit 701 and a data writing unit 702.

The write buffer determination unit 701 determines one buffer unit 901 to which the transmission/reception data is written from among the plurality of buffer units 901 which store unused status values. In this embodiment, the write buffer determination unit 701 collects the counter value stored in each counter unit 912 of the plurality of buffer units 901 used in the communication system related to the transmission/reception data as buffer information 907. Then, the buffer unit 901 having the counter unit 912 storing the oldest counter value is selected from the plurality of buffer units 901. Next, the status value is confirmed with reference to the status unit 913 of the selected buffer unit 901. When the status value is unused, the write buffer determination unit 701 notifies the data writing unit 702 of the selected buffer unit 901 as the write instruction 703. Alternatively, when the status value is in use (a value other than unused), the buffer unit 901 next older than the counter value of the selected buffer unit 901 is selected and the status unit 913 is confirmed again.

After repeating this operation until the status value becomes unused, the write instruction 703 is notified.

The data writing unit 702 writes the in-use status value to the status unit 913 of the buffer unit 901 indicated by the write instruction 703. Next, the data writing unit 702 writes the write data 904 as the transmission/reception data to the data unit 911 of the buffer unit 901 indicated by the write instruction 703, and also writes the latest counter value to the counter unit 912 of the buffer unit 901. Then, the unused status value is written to the status unit 913 of the buffer unit 901 indicated by the write instruction 703.

The SWC 601-2 of the reception side core 401-2 includes the read buffer determination unit 801 and the data reading unit 802.

The read buffer determination unit 801 determines one buffer unit 901 to which the transmission/reception data is read from among the plurality of buffer units 901 which store unused status values. In this embodiment, the read buffer determination unit 801 collects the counter value stored in each counter unit 912 of the plurality of buffer units 901 used in the communication system related to the transmission/reception data as the buffer information 907. Then, the buffer unit 901 having the counter unit 912 storing the latest counter value is selected from the plurality of buffer units 901.

Next, the status value is confirmed with reference to the status unit 913 of the selected buffer unit 901. When the status value is unused, the read buffer determination unit 801 notifies the data reading unit 802 of the selected buffer unit 901 as the read instruction 803. Alternatively, when the status value is in use (a value other than unused), the buffer unit 901 next older than the counter value of the selected buffer unit 901 is selected and the status unit 913 is confirmed again. After repeating this operation until the status value becomes unused, the read instruction 803 is notified.

The data reading unit 802 writes the in-use status value in the status unit 913 of the buffer unit 901 indicated by the read instruction 803. Next, the read data 905 as the transmission/reception data is read from the data unit 911 of the buffer unit 901 indicated by the read instruction 803. Then, the unused status value is written to the status unit 913 of the buffer unit 901 indicated by the read instruction 803.

According to this embodiment, when accessing the buffer unit 901 on the shared memory 405, exclusive processing is performed by using the status value stored in the buffer unit 901 to avoid access to the buffer unit in use. Therefore, for example, when using the plurality of buffer units 901 related to one communication system in multi-task processing in one core 401 or parallel processing in the plurality of cores 401, it is possible to prevent that other tasks or other cores access one buffer unit during one task or one core accesses the buffer unit.

Third Embodiment

Next, a third embodiment will be described.

The third embodiment is different from the first embodiment in that a memory failure determination unit 704 is provided, and even if there is the buffer unit 901 in which a part of the memory fails and cannot be used, the buffer unit 901 is excluded and the communication can be continued.

In the third embodiment, the vehicle system, the vehicle control system, the electronic control unit, and the functional module are the same as those in the above-mentioned first embodiment, and the description thereof will be omitted.

The shared memory and software components in the third embodiment will be described below with reference to FIG. 7.

<Configuration of Shared Memory and Software Component>

Figure 7:
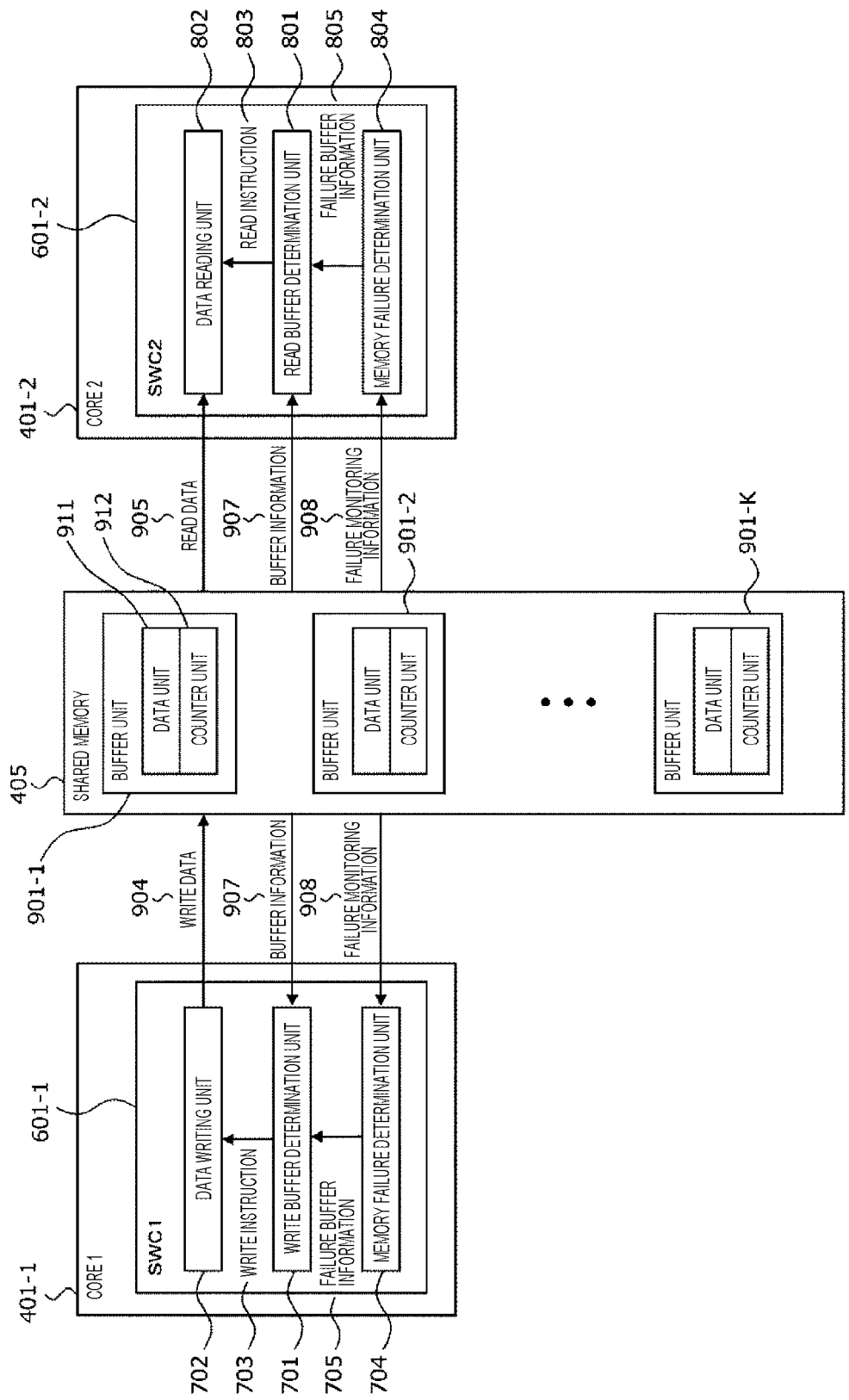
FIG. 7 is a diagram illustrating a relationship between each core and a buffer unit for inter-core communication in a third embodiment.

FIG. 7 illustrates a configuration example of software components realized by the shared memory 405 and each core 401 executing multi-core software.

In FIG. 7, two cores 401 perform data communication (inter-core communication) via the shared memory 405. That is, the transmission side core 401-1 writes data to the buffer unit 901 during the inter-core communication via the shared memory 405, and the reception side core 401-2 reads data from the buffer unit 901 during the inter-core communication.

Specifically, the transmission side core 401-1 confirms whether there is a failure in the buffer unit 901, selects the buffer unit 901 in which the oldest counter value is set from the buffer units 901 with no failure, and writes the data and the latest counter value in the buffer unit 901. The reception side core 401-2 confirms whether there is a failure in the buffer unit 901, selects the buffer unit 901 in which the latest counter value is stored from the buffer units 901 with no failure, and reads the data from the buffer unit 901.

The shared memory 405 has the same configuration as in the first embodiment.

Next, the software components will be described.

The SWC 601-1 of the transmission side core 401-1 includes the write buffer determination unit 701, the data writing unit 702, and the memory failure determination unit 704.

The memory failure determination unit 704 detects that the buffer unit 901 has a failure by the failure detection function. As a failure detection function, for example, an Error Check and Correct memory (ECC) circuit or a Built-in Self Test (BIST) circuit can be used to detect a memory failure. The memory failure determination unit 704 receives failure monitoring information 908 used for detecting these memory failures from the shared memory 405. When the memory failure determination unit 704 detects a memory failure, the memory failure determination unit 704 notifies the write buffer determination unit 701 of failure buffer information 705 indicating the failed buffer unit 901.

The write buffer determination unit 701 determines one buffer unit 901 to which transmission/reception data is written from among the plurality of buffer units 901 excluding the failed buffer unit 901 indicated by the failure buffer information 705. In this embodiment, the write buffer determination unit 701 excludes the failed buffer unit 901 indicated by the failure buffer information 705 from the plurality of buffer units 901 used in the communication system related to the transmission/reception data. The counter values stored in the respective counter units 912 of the remaining buffer units 901 are collected as the buffer information 907. Then, the buffer unit 901 having the counter unit 912 storing the oldest counter value is selected from the plurality of buffer units 901 which have collected the buffer information 907. Thereafter, the write buffer determination unit 701 notifies the data writing unit 702 of the selected buffer unit 901 as the write instruction 703.

The data writing unit 702 writes the write data 904 as the transmission/reception data to the data unit 911 of the buffer unit 901 indicated by the write instruction 703, and also writes the latest counter value to the counter unit 912 of the buffer unit 901.

The SWC 601-2 of the reception side core 401-2 includes the read buffer determination unit 801, the data reading unit 802, and a memory failure determination unit 804.

The memory failure determination unit 804 detects that the buffer unit 901 has a failure by the failure detection function. As a failure detection function, for example, an Error Check and Correct memory (ECC) circuit or a Built-in Self Test (BIST) circuit can be used to detect a memory failure. The memory failure determination unit 804 receives failure monitoring information 908 used for detecting these memory failures from the shared memory 405. When the memory failure determination unit 804 detects a memory failure, the memory failure determination unit 804 notifies the read buffer determination unit 801 of failure buffer information 805 indicating the failed buffer unit 901.

The read buffer determination unit 801 determines one buffer unit 901 to which transmission/reception data is read from among the plurality of buffer units 901 excluding the failed buffer unit 901 indicated by the failure buffer information 805. In this embodiment, the read buffer determination unit 801 excludes the failed buffer unit 901 indicated by the failure buffer information 805 from the plurality of buffer units 901 used in the communication system related to the transmission/reception data. The counter values stored in the respective counter units 912 of the remaining buffer units 901 are collected as the buffer information 907. Then, the buffer unit 901 having the counter unit 912 storing the latest counter value is selected from the plurality of buffer units 901 which have collected the buffer information 907. Thereafter, the read buffer determination unit 801 notifies the data reading unit 802 of the selected buffer unit 901 as the read instruction 803.

The data reading unit 802 reads the read data 905 as the transmission/reception data from the data unit 911 of the buffer unit 901 indicated by the read instruction 803.

According to this embodiment, even if some of the buffer units 901 become unavailable due to a failure, the inter-core communication using the buffer unit 901 with no failure is possible without stopping the communication.

Fourth Embodiment

Next, a fourth embodiment will be described.

The difference of the fourth embodiment from the first embodiment is that a communication identifier for identifying a communication system in the buffer unit 901 is stored, so that it is not necessary to provide the plurality of buffer units for each of the plurality of communication systems, and the inter-core communication without waiting time can be realized by using a small number of buffer units.

In the fourth embodiment, the vehicle system, the vehicle control system, the electronic control unit, and the functional module are the same as those in the above-mentioned first embodiment, and the description thereof will be omitted.

The shared memory and software components in the fourth embodiment will be described below with reference to FIGS. 8 and 9.

<Configuration of Shared Memory and Software Component>

Figure 8:
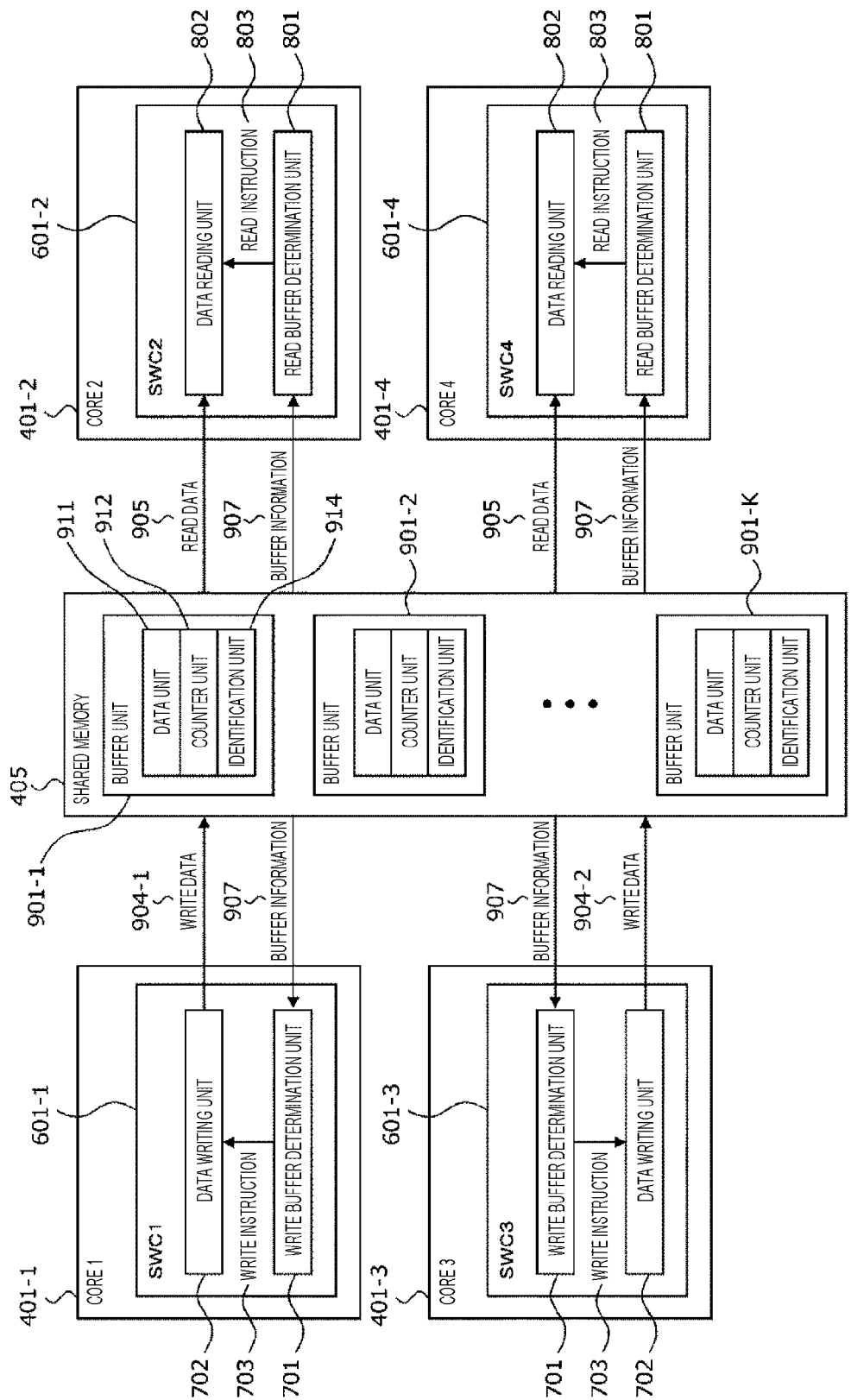
FIG. 8 is a diagram illustrating a relationship between each core and a buffer unit for inter-core communication in a fourth embodiment.

FIG. 8 illustrates a configuration example of software components realized by the shared memory 405 and each core 401 executing multi-core software.

In FIG. 8, four cores 401 perform data communication (inter-core communication) via the shared memory 405. That is, the transmission side core 401-1 writes data to the buffer unit 901 during the inter-core communication via the shared memory 405, and the reception side core 401-2 reads data from the buffer unit 901 during the inter-core communication. In addition, a transmission side core 401-3 writes data to the buffer unit 901 during the inter-core communication via the shared memory 405, and a reception side core 401-4 reads data from the buffer unit 901 during the inter-core communication.

Specifically, the buffer unit 901 stores a communication identifier that uniquely identifies the communication system. One communication identifier is used for the inter-core communication between the core 401-1 and the core 401-2, and another communication identifier different from the one communication identifier is used for the inter-core communication between the core 401-3 and the core 401-4.

When transmitting data in the inter-core communication with the core 401-2, the transmission side core 401-1 selects the buffer unit 901 in which the oldest counter value is set from among the buffer units 901 that store the communication identifier (for example, communication identifier A) of the communication system related to the corresponding inter-core communication, and writes the data of the buffer unit 901, the latest counter value in the communication system, and the communication identifier A of the corresponding communication system. When receiving the data in the inter-core communication with the core 401-1, the reception side core 401-2 selects the buffer unit 901 in which the latest counter value is set from among the buffer units 901 that store the communication identifier A of the communication system related to the corresponding inter-core communication, and reads the data from the corresponding buffer unit.

In addition, when transmitting data in the inter-core communication with the core 401-4, the transmission side core 401-3 selects the buffer unit 901 in which the oldest counter value is set from among the buffer units 901 that stores the communication identifier (for example, communication identifier B) of the communication system related to the corresponding inter-core communication, and writes the data of the buffer unit 901, the latest counter value in the communication system, and the communication identifier B of the corresponding communication system. When receiving the data in the inter-core communication with the core 401-3, the reception side core 401-4 selects the buffer unit 901 in which the latest counter value is set from among the buffer units 901 that store the communication identifier B of the communication system related to the corresponding inter-core communication, and reads the data from the corresponding buffer unit.

Each core 401 has communication identification information 1001. FIG. 9 illustrates an example of a table in which communication identification information 1001 (1001-1, 1001-2, 1001-3, . . . ) is stored. With respect to the transmission/reception data of the inter-core communication, each core 401 acquires the communication identifier and the data type used in the communication system related to the transmission/reception data with reference to the communication identification information 1001.

The communication identification information 1001 has a communication identifier 1002, a sender name 1003, a receiver name 1004, a data type 1005, and a label name 1006. The communication identification information 1001 may include information other than these components.

The communication identifier 1002 is data represented by numbers, characters, symbols, or a combination thereof, and a value that uniquely identifies the communication system is set. The sender name 1003 is data represented by numbers, characters, symbols, or a combination thereof, and indicates the SWC 601 or the like on the transmission side. The receiver name 1004 is data represented by numbers, characters, symbols, or a combination thereof, and indicates the SWC 601 or the like on the reception side. The data type 1005 indicates the data type of transmission/reception data transmitted/received in the communication system identified by the communication identifier 1002. The data type 1005 is set to a value that represents various data types (Int type, Long type, Float type, Char type, Boolean type, . . . ) or data types that can declare software variables such as arrays, structures, and pointer types. The label name 1006 is data represented by numbers, characters, symbols, or a combination thereof, and information related to the communication identification information 1001 is added. In this embodiment, the label name 1006 represents, for example, an accelerator depression amount, a brake depression amount, a steering wheel operation amount, and the like, and has a one-to-one correspondence with the communication identifier 1002. The communication identification information 1001 needs to be a unique combination for different communication identifiers, and the communication identifiers 1002 are different, but the communication identification information in which other information is the same is not necessarily exist.

For example, when transmitting and receiving data regarding the accelerator depression amount by the inter-core communication, each core 401 extracts the communication identification information 1001 including the label name 1006 relating to the accelerator depression amount from the table, and transmits/receives the data using the communication identifier 1002 and the data type 1005 of the extracted communication identification information 1001.

Next, the configuration of the shared memory 405 will be described.

The shared memory 405 is provided with the plurality of buffer units 901 (901-1, 901-2, . . . , 901-K; K is a natural number of 2 or more) used for transmitting and receiving data in inter-core communication. The plurality of buffer units 901 are shared by the plurality of communication systems.

Each buffer unit 901 of the shared memory 405 includes the data unit 911, the counter unit 912, and an identification unit 914.

The data unit 911 and the counter unit 912 have the same configurations as in the first embodiment.

The identification unit 914 stores the above-mentioned communication identifier.

Next, the software components will be described.

The SWC 601-1 of the transmission side core 401-1 and the SWC 601-3 of the core 401-3 include the write buffer determination unit 701 and the data writing unit 702.

The write buffer determination unit 701 determines one buffer unit 901 to which transmission/reception data is written from among the plurality of buffer units 901 in which the communication identifier for identifying the communication system related to the transmission/reception data is stored in the identification unit 914. In this embodiment, the write buffer determination unit 701 extracts the plurality of buffer units 901 in which the communication identifier for identifying the communication system related to the transmission/reception data is stored in the identification unit 914. The counter values stored in the respective counter units 912 of the extracted buffer units 901 are collected as the buffer information 907. Then, the buffer unit 901 having the counter unit 912 storing the oldest counter value is selected from the plurality of buffer units 901. Thereafter, the write buffer determination unit 701 notifies the data writing unit 702 of the selected buffer unit 901 as the write instruction 703.

The data writing unit 702 writes the write data 904 as the transmission/reception data to the data unit 911 of the buffer unit 901 indicated by the write instruction 703, and also writes the latest counter value to the counter unit 912 of the buffer unit 901.

The SWC 601-2 of the reception side core 401-2 and the SWC 601-4 of the core 401-4 include the read buffer determination unit 801 and the data reading unit 802.

The read buffer determination unit 801 determines one buffer unit 901 to which transmission/reception data is read from among the plurality of buffer units 901 in which the communication identifier for identifying the communication system related to the transmission/reception data is stored in the identification unit 914. In this embodiment, the read buffer determination unit 801 extracts the plurality of buffer units 901 in which the communication identifier for identifying the communication system related to the transmission/reception data is stored in the identification unit 914. The counter values stored in the respective counter units 912 of the extracted buffer units 901 are collected as the buffer information 907. Then, the buffer unit 901 having the counter unit 912 storing the latest counter value is selected from the plurality of buffer units 901. Thereafter, the read buffer determination unit 801 notifies the data reading unit 802 of the selected buffer unit 901 as the read instruction 803.

The data reading unit 802 reads the read data 905 as the transmission/reception data from the data unit 911 of the buffer unit 901 indicated by the read instruction 803.

According to this embodiment, the communication system is identified by the communication identifier, and the communication identifier is written in the buffer unit together with the data. Therefore, by acquiring the communication identifier from the buffer unit, it can be easily known that the data of the buffer unit is data of which communication system. By using the communication identifier, the same buffer unit can be used in the plurality of communication systems, and the inter-core communication without communication standby can be performed using a smaller number of buffer units (memory areas).

Fifth Embodiment

Next, a fifth embodiment will be described.

The fifth embodiment is different from the first embodiment in that a write control unit is provided so that simultaneous writing by the plurality of data writing units can be avoided.

In the fifth embodiment, the vehicle system, the vehicle control system, the electronic control unit, and the functional module are the same as those in the above-mentioned first embodiment, and the description thereof will be omitted.

The shared memory and software components in the fifth embodiment will be described below with reference to FIG. 10.

<Configuration of Shared Memory and Software Component>

Figure 10:
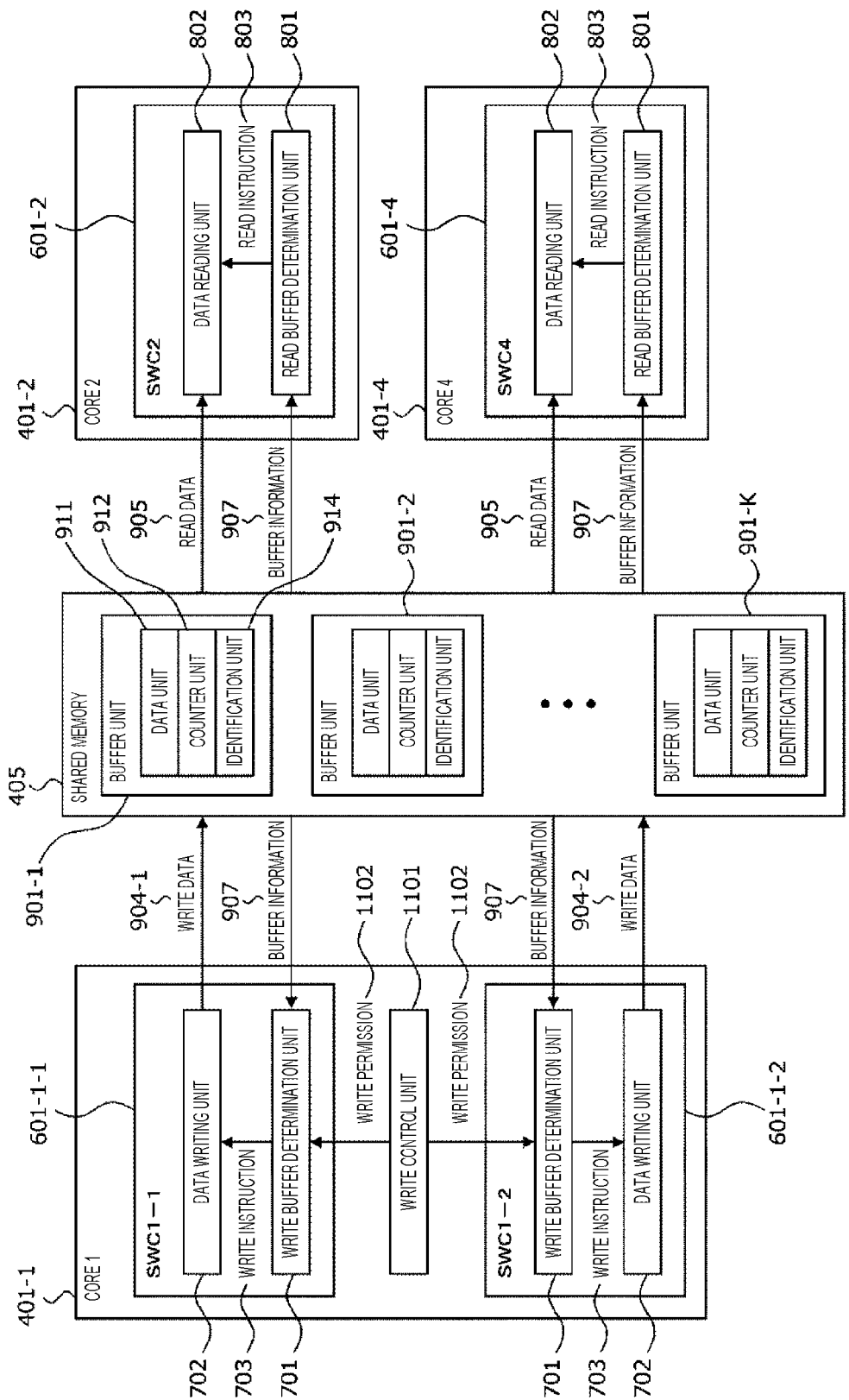
FIG. 10 is a diagram illustrating a relationship between each core and a buffer unit for inter-core communication in a fifth embodiment.

FIG. 10 illustrates a configuration example of software components realized by the shared memory 405 and each core 401 executing multi-core software.

In FIG. 10, three cores 401 perform data communication (inter-core communication) via the shared memory 405. That is, the transmission side core 401-1 writes data to the buffer unit 901 during the inter-core communication via the shared memory 405, the reception side core 401-2, and the core 401-4 reads data from the buffer unit 901 during the inter-core communication.

Specifically, the transmission side core 401-1 executes multitask processing, and two software components (SWC) 601-1-1 and 601-1-2 are operating. The two SWCs 601-1-1 and 601-1-2 perform inter-core communication of the same communication system with the cores 401-2 and 401-4.

When transmitting data in the inter-core communication with the core 401-2, the transmission side SWC 601-1-1 and SWC 601-1-2 select the buffer unit 901 in which the oldest counter value is set from among the buffer units 901 that store the communication identifier of the communication system related to the corresponding inter-core communication, and writes the data of the buffer unit 901, the latest counter value in the communication system, and the communication identifier of the corresponding communication system. When receiving the data in the inter-core communication with the core 401-1, the reception side cores 401-2 and 401-4 selects the buffer unit 901 in which the latest counter value is set from among the buffer units 901 that store the communication identifier of the communication system related to the corresponding inter-core communication, and reads the data from the corresponding buffer unit.

Then, the transmission side core 401-1 controls conflicts not to simultaneously write data when a plurality of data writing to the buffer unit 901 related to one communication system occur in the multitask processing of the SWC 601-1-1 and the SWC 601-1-2.

The shared memory 405 has the same configuration as in the fourth embodiment.

The transmission side core 401-1 has the SWC 601-1-1 and the SWC 601-1-2, and a write control unit 1101.

The write control unit 1101 transmits write permission exclusively to each data writing unit 702 to perform control (conflict control) such that the data writing unit 702 of the SWC 601-1-1 and the data writing unit 702 of the SWC 601-1-2 do not simultaneously write the transmission/reception data related to one communication system to the buffer unit 901 of the shared memory 405. The write control unit 1101 transmits write permission 1102 to the write buffer determination units 701 of the SWC 601-1-1 and SWC 601-1-2 at a predetermined timing. In this embodiment, the write control unit 1101 controls conflicts between two SWCs 601-1-1 and 601-1-2 operating in one core 401-1, but the conflict control of the data writing unit 702 of the SWC 601 of different core 401 may be performed.

Next, the software components will be described.

The SWC 601-1-1 of the transmission side core 401-1 and the SWC 601-1-2 include the write buffer determination unit 701 and the data writing unit 702.

When receiving the write permission 1102 from the write control unit 1101, the write buffer determination unit 701 determines one buffer unit 901 to which the transmission/reception data is written from among the plurality of buffer units 901 in which the communication identifier for identifying the communication system related to the transmission/reception data is stored in the identification unit 914. In this embodiment, when receiving the write permission 1102 from the write control unit 1101, the write buffer determination unit 701 extracts the plurality of buffer units 901 in which the communication identifier for identifying the communication system related to the transmission/reception data is stored in the identification unit 914, and collects the counter value stored in each counter unit 912 of the extracted buffer unit 901 as the buffer information 907. Then, the buffer unit 901 having the counter unit 912 storing the oldest counter value is selected from the plurality of buffer units 901. Then, the write buffer determination unit 701 notifies the data writing unit 702 of the selected buffer unit 901 as the write instruction 703.

The data writing unit 702 writes the write data 904 as the transmission/reception data to the data unit 911 of the buffer unit 901 indicated by the write instruction 703, and also writes the latest counter value to the counter unit 912 of the buffer unit 901.

The core 401-2 and the core 401-4 on the reception side have the same configuration as the core 401-2 of the fourth embodiment.

According to this embodiment, with the write control unit, it is possible to prevent a plurality of data writing units from writing data in the same buffer unit at the same time.

Persons who have common knowledge in the technical field may consider other modifications of the disclosure from the specification and the embodiments of the disclosure. Various or components of the above-described embodiments may be used alone or in any combination. The specification and specific examples are merely exemplary, and the scope and concept of the present disclosure are shown in the claims.

REFERENCE SIGNS LIST

1 vehicle system
2 vehicle control system
3 communication device
4 other vehicle control system
5 drive device
6 recognition device
7 output device
8 input device
9 notification device
301 network link
302 ECU
303 GW
401 core
402 local memory
403 timer
404 ROM
405 shared memory
406 communication unit
407 external memory
408 internal bus
501 control unit
502 communication management unit
503 time management unit
504 data table
505 buffer
601 SWC
701 write buffer determination unit
702 data writing unit
703 write instruction
704 memory failure determination unit
705 failure buffer information
801 read buffer determination unit
802 data reading unit
803 read instruction
804 memory failure determination unit
805 failure buffer information
901 buffer unit
904 write data
905 read data
907 buffer information
908 failure monitoring information
911 data unit
912 counter unit
913 status unit
914 identification unit
1001 communication identification information
1002 communication identifier
1003 sender name
1004 receiver name
1005 data type
1006 label name
1101 write control unit
1102 write permission
NL other network link

The invention claimed is:

1. A processing device for performing parallel processing by a plurality of cores, and performing an inter-core communication of a plurality of communication systems that are distinguished as separate communications by the plurality of cores, the processing device comprising:
a shared memory that is accessible by the plurality of cores at the same time and is provided with a plurality of buffer units that can be used for the inter-core communication;
a transmission core that writes data to the buffer unit in the inter-core communication via the shared memory; and
a reception core that reads data from the buffer unit in the inter-core communication,
wherein, when transmitting data by the inter-core communication, the transmission core stores the data and a counter value updated according to a writing order to the buffer unit determined by a counter value managed for each of the communication systems respectively stored in the plurality of buffer units, and
wherein, when receiving data in the inter-core communication, the reception core reads data from a buffer unit in which latest data of each of the communication systems, which is determined by the counter value stored in each of the plurality of buffer units.

2. The processing device according to claim 1,
wherein the buffer unit stores a status value indicating whether the buffer unit is in use or unused,
wherein the transmission core selects the buffer unit, in which an oldest counter value is stored, from the buffer units in which the unused status value is stored, stores the in-use status value before writing the data to the buffer unit, and stores the unused status value after writing the data to the buffer unit, and
wherein the reception core selects a buffer unit, in which a latest counter value is stored, from the buffer units in which the unused status value is stored, stores the in-use status value before reading the data from the buffer unit, and stores the unused status after reading the data from the buffer unit.

3. The processing device according to claim 1,
wherein the transmission core confirms whether there is a failure in a buffer unit, selects the buffer unit having an oldest counter value from the buffer units having no failure, and writes the data and a latest counter value to the buffer unit, and
wherein the reception core confirms whether there is a failure in the buffer unit, selects the buffer unit, in which the latest counter value is stored, from the buffer units having no failure, and reads the data from the buffer unit.

4. The processing device according to claim 1,
wherein the buffer unit stores a communication identifier that uniquely identifies the communication system, wherein, when transmitting data in the inter-core communication, the transmission core selects a buffer unit, in which an oldest counter value is set, from the buffer units in which the communication identifier of the communication system related to the inter-core communication is stored, and writes the data, a latest counter value in the communication system, and the communication identifier of the communication system in the buffer unit, and wherein, when receiving data in the inter-core communication, the reception core selects the buffer unit, in which the latest counter value is set, from the buffer units in which the communication identifier of the communication system related to the inter-core communication, and reads data from the buffer unit.

5. The processing device according to claim 1,
wherein the transmission core includes a write control unit which controls conflicts not to write data simultaneously in a case where a plurality of data writing to the buffer unit related to one communication system occur in multi-task processing of the transmission core or parallel processing with another transmission core.

6. The processing device according to claim 1,
wherein the transmission core writes the data and a latest counter value to the buffer unit in which an oldest counter value is stored in the buffer unit of the communication system, and wherein the reception core reads data from a buffer unit that stores a latest counter value in the buffer units of the communication system.

7. The processing device according to claim 1,
wherein the processing device is a multi-core microcomputer for vehicle control, which is mounted on a vehicle and controls the vehicle based on a state of the vehicle and a control instruction.

* * * * *